United States Patent
Herre et al.

(10) Patent No.: US 9,582,942 B2
(45) Date of Patent: Feb. 28, 2017

(54) ERROR LOGGING METHOD FOR A COATING PLANT

(75) Inventors: Frank Herre, Oberriexingen (DE); Dietmar Wildermuth, Stuttgart (DE); Roland Wolf, Holzgerlingen (DE)

(73) Assignee: Durr Systems GmbH, Stuttgart (DE)

( * ) Notice: Subject to any disclaimer, the term of this patent is extended or adjusted under 35 U.S.C. 154(b) by 2404 days.

(21) Appl. No.: 12/517,131

(22) PCT Filed: Nov. 7, 2007

(86) PCT No.: PCT/EP2007/009657
§ 371 (c)(1),
(2), (4) Date: Feb. 2, 2010

(87) PCT Pub. No.: WO2008/064763
PCT Pub. Date: Jun. 5, 2008

(65) Prior Publication Data
US 2010/0161141 A1    Jun. 24, 2010

(30) Foreign Application Priority Data
Dec. 1, 2006    (DE) .................. 10 2006 056 879

(51) Int. Cl.
    *G07C 3/00*        (2006.01)
    *G05B 23/02*      (2006.01)
    *B05B 12/00*      (2006.01)

(52) U.S. Cl.
    CPC .......... *G07C 3/00* (2013.01); *G05B 23/0264* (2013.01); *B05B 12/004* (2013.01);
(Continued)

(58) Field of Classification Search
CPC ............... G07C 3/00; G05B 23/0264; G05B 2219/35291; G05B 2219/45013; G05B 2219/33297; B05B 12/004
(Continued)

(56) References Cited

U.S. PATENT DOCUMENTS 6,298,454 B1    10/2001   Schleiss et al.
6,459,938 B1 *   10/2002   Ito .......................... G08C 19/28
                                           315/295
(Continued)

FOREIGN PATENT DOCUMENTS

DE        3224586 A1     1/1984
DE     10007972 A1   10/2000
(Continued)

OTHER PUBLICATIONS

International Search Report, PCT/EP2007/009657, Dated Mar. 4, 2008.

*Primary Examiner* — Ronald Hartman, Jr.
(74) *Attorney, Agent, or Firm* — Bejin Bieneman PLC

(57) ABSTRACT

An error logging method for a coating plant is disclosed. The error logging method generally includes capturing an error during running of process data records for the coating plant, wherein the individual process data records are ordered according to the given time of operation of the coating plant and each of which contain various process data of the coating plant. The method may further include storage of the captured process data records, detection of a possible error condition of the coating plant, and/or production of an error code when detection of an error condition of the coating plant occurs. The various examples may also relate to storage of the error code in chronological order with the stored process data records.

21 Claims, 2 Drawing Sheets

(52) U.S. Cl.
CPC .............. *G05B 2219/33297* (2013.01); *G05B 2219/35291* (2013.01); *G05B 2219/45013* (2013.01)

(58) Field of Classification Search
USPC ........ 700/73; 702/84, 182–183, 187; 714/48
See application file for complete search history.

(56) References Cited

U.S. PATENT DOCUMENTS

| | | | | |
|---|---|---|---|---|
| 6,522,939 | B1* | 2/2003 | Strauch | G05B 19/41875 700/108 |
| 7,493,517 | B2* | 2/2009 | Sugimoto | G06F 11/1658 714/11 |
| 8,726,091 | B2* | 5/2014 | Guenther | G05B 19/0426 702/183 |
| 2001/0047504 | A1 | 11/2001 | Aoyama | |
| 2005/0081129 | A1* | 4/2005 | Shah | H04L 1/0047 714/701 |
| 2005/0159835 | A1* | 7/2005 | Yamada | G06Q 10/06 700/109 |

FOREIGN PATENT DOCUMENTS

| | | |
|---|---|---|
| DE | 10036741 A1 | 2/2002 |
| DE | 102005024010 A1 | 11/2006 |
| EP | 0887721 A1 | 12/1998 |
| EP | 1302828 A2 | 4/2003 |
| JP | H06149347 A | 5/1994 |
| JP | H08152912 A | 6/1996 |
| JP | H11331766 A | 11/1999 |
| JP | 2000235412 A | 8/2000 |
| JP | 2000288876 A | 10/2000 |
| JP | 2002049414 A | 2/2002 |
| JP | 2003195934 A | 7/2003 |
| JP | 2003295925 A | 10/2003 |
| JP | 2004201125 A | 7/2004 |
| JP | 2004240513 A | 8/2004 |
| JP | 2005313077 A | 11/2005 |
| JP | 2005346655 A | 12/2005 |
| RU | 2110841 C1 | 5/1998 |
| WO | WO-0213015 A1 | 2/2002 |
| WO | WO-03067350 A | 8/2003 |

* cited by examiner

ERROR LOGGING METHOD FOR A COATING PLANT

CROSS-REFERENCE TO RELATED APPLICATIONS

This application is a National Phase application claiming the benefit of International Application No. PCT/EP2007/009657, filed Nov. 7, 2007, which claims priority to German Patent Application No. DE 10 2006 056 879.6, filed Dec. 1, 2006, the complete disclosures of which are hereby incorporated in by reference in their entireties.

FIELD

The present disclosure concerns an error logging method for a coating plant in accordance with various exemplary illustrations.

BACKGROUND

A plurality of process data accumulates in the operation of paint shops for painting motor vehicle body components, for example the current position of application and painting robots, the speed of rotary atomisers, the charging voltage of electrostatic application devices or the flow rate of the individual media (e.g. paint and guide air), to name only some of the process data. Process data logging during continuous operation of the paint shop facilitates error analysis using the stored process data when a data error causes a malfunction in the paint shop.

Firstly, the Primas system, in which the process data accumulating during continuous operation of the paint shop are permanently and indefinitely stored in an external mass memory, installed by the operator of the paint shop, is used to log the process data. An initial disadvantage of said Primas system is the large memory requirement for storing the process data. A further disadvantage of the Primas system is the fact that the individual process data are logged and correspondingly stored without time synchronisation. For example, the control system of painting and application robots may have a slightly different system time from the conveyor control unit which conveys the motor vehicle body components to be painted through the paint shop. Such time synchronisation errors hinder later error analysis using the stored process data, as no precise time allocation of the process data is possible.

Secondly, in practice the process data accumulating are logged by the Softlog system or by data recorders. However, the process data to be logged must first be specified, to form a channel, before recording. When logging with data recorders, it is even necessary to lay cables before recording, the number of signals and the process data to be recorded being restricted. Such systems are usually only used for fault-finding for series errors and are not present in every paint shop. Furthermore, the duration of recording and the number of recording channels are restricted.

The Primas and Softlog systems both have the disadvantage that the process data accumulating is recorded independently of an error in the paint shop.

The Primas and Softlog systems also have the disadvantage that intermittent errors can only be analysed with extensive outlay, a lot of time being required for fault finding.

DE 32 24 586 A1 generally discloses an operating data logging method which can be used in the automotive industry. The operating data accumulating are continuously written to a memory. The accumulated, stored operating data can then be examined on a monitor in subsequent analysis of a recording period. A large memory is therefore required, as with the aforementioned, known Primas system. Furthermore, error analysis is also difficult in this case, as attribution of the operating data to an error is difficult.

A method of inspecting the quality of coating in a paint shop is disclosed in DE 100 36 741 A1, in which any errors may be saved in a database for each workpiece at the time of coating. Storage in the database is thus workpiece- and not error-related. Moreover, the database contains a plurality of errors which have occurred during the coating period, which hinders error analysis.

Finally, a system for determining the cause of errors, which is to be used, for example, in hot-rolling mills, is disclosed in WO 02/013015 A1. However, attribution of an error occurring to the appropriate process data sets is difficult in this case too.

Accordingly, there is a need for improving the above-mentioned error logging methods.

DESCRIPTION OF THE DRAWINGS

Other advantageous exemplary illustrations are explained below in conjunction with the description of the various exemplary illustrations provided herein, using the drawings. These Figures show the following.

DETAILED DESCRIPTION

Figure 1:
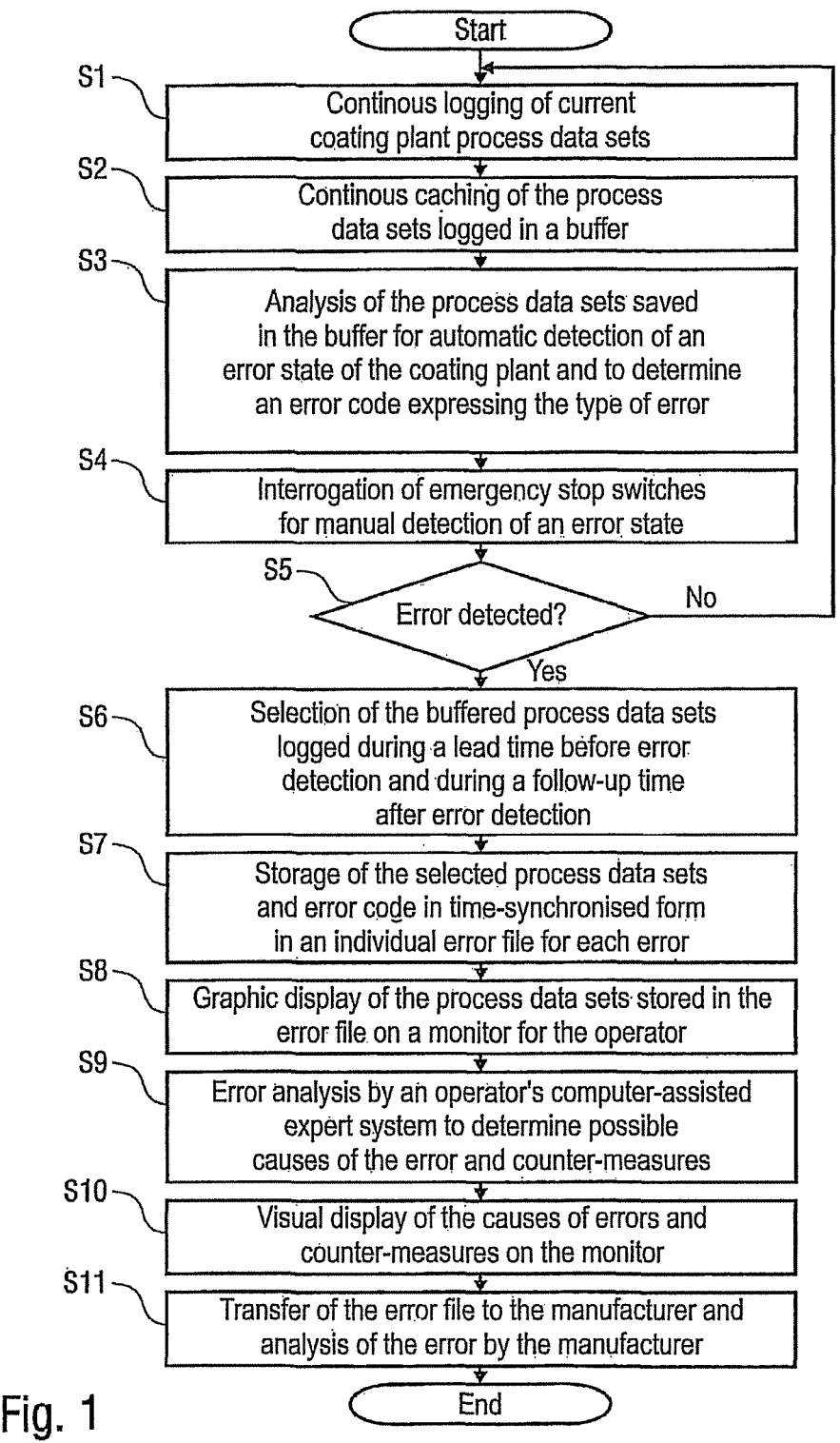
FIG. 1 shows an exemplary error logging method in the form of a flow chart.

According to various exemplary illustrations provided herein, process data sets of a coating plant may be logged continuously during operation, the individual process data sets each being attributed to certain points in coating plant operating time and each containing multiple process data of the coating plant.

The logged process data sets are then saved continuously, to allow later error analysis using the stored process data sets.

The present disclosure also provides for error detection taking place during operation of the coating plant, in order to detect a malfunction in the coating plant, whereby error detection can take place in different ways, as will be described below in detail.

An error code, which may contain a variety of information, as will also be described in detail below, is then generated as a function of error detection.

In addition to the aforementioned methods, the present disclosure also provides for the error code to be saved in time synchronisation with the stored process data sets. During later error analysis, this allows precise attribution by time to the time curves of the stored process data using the stored data sets and the error code also stored, which facilitates error analysis considerably.

The concept of continuous logging of process data sets as described herein generally means that the process data sets are logged during normal coating operation, i.e. without interrupting coating operation. The logging of process data sets may be continuous or alternatively non-continuous, i.e. at a specific sampling frequency. The same may apply analogously to saving the logged process data sets and to error detection and saving error codes.

The process data sets accumulating continuously during operation, of the coating plant may advantageously be first cached in a buffer, which may, for example, be a circular buffer, in which the accumulating process data sets are saved continuously during a certain period and subsequently overwritten, to free the memory for new process data sets. For example, such a circular buffer may have a recording duration of between 10 seconds and several hours or days.

When an error is detected, the cached process data sets logged within a specific lead time before detection of the error state and/or a specific follow-up time after detection of the error state are selected from the buffer, as these process data sets are relevant to error analysis, whilst process data sets accumulating earlier or later do not usually permit the error to be traced. Advantageously, in the case of an error, only those process data sets may be stored for later error analysis which are logged within a certain time frame around the time of the error. This concept of selection and storage of process data sets from a time frame around the time of the error is demonstrated herein in the form of various exemplary illustrations. The exemplary illustrations therefore also comprise an error logging method in general, in which neither the generation and storage of an error code nor time synchronisation with the error are absolutely necessary.

The error-related process data sets selected in the abovementioned way may then be stored in an error memory, to allow later error analysis.

The individual error codes with the associated process data sets may be saved in a dedicated error file for each error state of the coating plant. This firstly has the advantage that the individual error files contain only the data relevant to analysis of the respective error, which facilitates error analysis due to the greater clarity. Secondly, attribution of the individual errors to one dedicated error file respectively allows optimum error analysis by an error-specific specialist. For example, an error file which results from an error in the application system can be analysed by a specialist in application systems, whereby the error file can also be sent to the respective specialist, e.g. by e-mail. In contrast, an error file originating from a malfunction in the conveyor system can be analysed by a conveyor system specialist.

The aforementioned concept of an error file for each error state is also described herein in various exemplary illustrations. The exemplary illustrations therefore also include an error logging system in general, in which only the process data sets belonging to an error state are each saved in a single error file, whilst generation and storage of the error code are not absolutely necessary.

In the simplest case, the error code may be a timestamp, which only reproduces the time of the error, to allow attribution of the time of the error to the process data time curves by time. However, it is also possible for the error code to reproduce the type of error detected. For example, the various operational malfunctions of a coating plant may be classified as conveyor system errors, application system errors or high-tension errors, to name but a few. Moreover, the error type can state which process data are outside the permitted range.

In the aforementioned selection of buffered process data sets within a specific lead or follow-up time, the lead or follow-up time can be a specific range, which may, for example, be between 10 seconds and 10 minutes, to allow informative error analysis.

Alternatively, other examples provide the possibility for the lead or follow-up time to be a specific period, within which a specified number of skids or components to be coated is conveyed through the coating plant.

There is also a possibility within the scope of the various illustrations for the lead or follow-up time to be a specific period which comprises a certain number of conveyor cycles of the coating plant conveyor system. The lead or follow-up time may therefore also be defined by a specified period, or a number or components, skids or conveyor cycles, The follow-up time may also be the period between error detection and subsequent rectification of the error state so that all the process data sets accumulating between error detection and error rectification are selected.

Saving process data sets and/or error detection may take place with temporal resolution of at least 0.1 ms, 1 ms, 10 ms or at least 200 ms, which is advisable for efficient error analysis due to the highly dynamic operation of modern coating plants.

There are many possibilities in respect of the coating plant process data to be logged and saved, of which some will be described below.

For example, process data may be component data which characterises the components to be coated. The component data stored may specify whether the body of a sub-compact, compact, estate or luxury car is being painted at a given time.

Furthermore, user data can also be logged and saved as process data, characterising the interaction between an operator and the coating plant. For example, the user data may include all the entries (e.g. keyboard entries, switch operations, etc) by an individual operator, in order to be able to detect operating errors and attribute them individually later. Moreover, the user data can also include coating plant outputs (e.g. on-screen messages, alarms, etc) perceived by the operators. Thus, it can be established whether the operators may possibly have ignored coating plant alarms during later analysis.

Plant data which characterises the operating response of the coating plant itself may also be logged as process data. A variety of data accumulating in a coating plant may be considered plant data and is explained by way of example below.

For example, the coating plant data stored as process data may state which colour is currently being applied in the coating plant and/or which colour was being applied in the coating plant before. In this way it can be established during later error analysis whether certain colours or certain colour time sequences are causing problems.

The plant data saved as process data can also contain the respective identification number of the skid currently in the coating plant. In this way it can be established during later error analysis whether certain skids are causing operating problems.

Furthermore, the identification number of the component currently in the coating plant can be recorded, making it possible during later error analysis to attribute the error occurring to a certain component, which may possibly deviate from specification and thus have caused the error.

An identification number can also be saved which denotes the looped main of the coating plant used. In this way it can be determined during later error analysis whether certain looped mains are causing errors, for example because of a change in viscosity or fluctuations in pressure. A blockage in a looped main is also a theoretical cause of an error.

The speed of a rotary atomiser, the charging voltage of an electrostatic application device, the volume of coating medium currently being applied, the flow rate of other media (e.g. guide air, horn air, driving air, etc) and the pressure of the various media (e.g. paint, air, flushing agents, etc) are also of particular interest as coating plant process data.

In a pigged pipe arrangement, the respective position of the pig can also be detected and saved, in order to detect pig-specific malfunctions of the coating plant.

Furthermore, the temperature in the coating plant, the filling levels of the coating plant and the switching position of valves in the coating plant can be logged and saved as process data.

The position, speed, acceleration and/or torque of a painting or application robot are also of particular interest to later error analysis and may therefore also be logged and stored as process data.

Furthermore, target/actual deviations of one or more of the aforementioned process data can also be logged and stored as process data.

Thus, examples of process data that may be logged and/or stored as part of an exemplary error logging system include, but are not limited to:
a) Time,
b) Sensor data, which reproduces the measurement signals from sensors,
c) Colour of the coating agent currently being applied in the coating plant,
d) Colour of the coating agent previously applied in the coating plant,
e) Identification number of the skid currently located in the coating plant,
f) Identification number of the component currently located in the coating plant, particularly a body, or the components currently located in the coating plant,
g) Type of component or components currently located in the coating plant,
h) Identification number of the looped main of the coating plant currently in use,
i) Identification number of the colour used,
j) Speed of a rotary atomizer,
k) Electrical charging voltage of an electrostatic application device,
l) Electrical charging current of an electrostatic application device,
m) Volume of the coating agent currently being applied,
n) Flow rate of the individual media, particularly flushing agents, solvents, guide air, shroud air for flat spray, knife air, envelope air, drying air, cooling air, turbine bearing air,
o) Current flow of the individual air guide currents,
p) Current guide air pressure,
q) Current horn air flow, current horn air pressure,
r) Current driving air flow, current driving air pressure,
s) Paint pressure,
t) Air pressure and all available air pressure sensor measurements
u) Flushing agent pressure,
v) Pig positions,
w) Temperatures in the coating plant,
x) Moisture in the coating plant,
y) Paint cabin status, particularly ventilation status, water washout status, extraction status
z) Coating plant filling levels,
aa) Coating plant valve switch positions
bb) Position, speed, acceleration, torque of a painting robot,
cc) Target/actual deviation of one or more of the aforementioned process data,
dd) User entries
ee) Brush data, movement program number of the robot,
ff) Conveyor data, particularly conveyor increments and status,
gg) Dryer data and status,
hh) Exchange of data between the control components However, the exemplary illustrations are not restricted to the aforementioned examples in respect of the process data to be logged and stored, but can also be implemented with other process data.

In one example, the process data sets logged and/or the error code are sent electronically to a maintenance service, which may be located at the manufacturer of the respective coating plant and therefore have special skills which facilitate error analysis. For example, the raw data may be sent electronically to the maintenance service, so that caching, selection and time-synchronised storage take place at the maintenance service. In contrast, caching and selection of the error-related process data may take place at the operator of the coating plant, so that only the aforementioned error file is sent to the maintenance service.

Of course, within the scope of the exemplary illustrations it is also possible to transport the process data or error file to the maintenance service on a storage medium (e.g. a diskette or memory stick), instead of sending it via remote data transmission.

It must also be mentioned that error detection within the scope of the exemplary error logging methods may take place in different ways. In one example, error detection is computer controlled, using automatic analysis of the process data sets of the coating plant logged. Within the scope of such analysis, it may, for example, be examined whether the individual process data has exceeded specific ranges, which would then be detected as an error. In contrast, in another example, error detection is user-controlled by an operator, e.g. by operating an emergency stop switch. Both the aforementioned alternative error detection methods can be combined with each other within the scope of the exemplary illustrations.

Within the scope of aforementioned computer-controlled error detection using analysis of the process data sets logged, the time curves of the process data sets logged can be compared with specified error curves. For example, an error can be detected if the process data display a certain time curve.

Not only logging and selective storage of the process data sets preferably take place within the scope of the inventive error logging method, but also a visual display, to facilitate error analysis by an operator. The visual display of the process data sets then may advantageously take place time-synchronised with the relevant error detection in graphical form on a monitor. For example, the time curves of different process data can be displayed superimposed on each other on the monitor, whereby an error code specifying the precise time of the error is displayed on the monitor. Moreover, the position of the application and painting robots at the time of the error may be shown on the visual display, by displaying a three-quarter view of the application and painting robots.

Furthermore, one exemplary illustration provides for computer-controlled determination of possible causes of errors and/or remedies when errors are detected, by analysing the stored error code and the relevant process data sets. The causes of the errors are determined or remedies can then be displayed visually on the monitor, to provide initial indications in error analysis.

Furthermore, one example provides for suppression of error detection for a specified period when an error is detected, so that consequential errors can be ignored.

Finally, it must be mentioned that the exemplary illustrations comprise not only the inventive error logging method described above, but also a data storage medium storing a computer program to run said error logging method, if said computer program is loaded on an appropriate computer or control processor.

The exemplary illustrations also comprise a corresponding error logging device which implements the aforementioned error logging method.

An exemplary illustration of an error logging system will now be described, with reference to the drawings.

Continuous measurement of current process data sets of the coating plant takes place in a first step S1, whereby the individual process data sets each contain a variety of coating plant process data, such as, for example, the flow rate of the individual media (e.g. paint, guide air, driving air, etc), the speed of a rotary atomiser, or component-specific data, such as the type of components currently being painted.

In a further step S2, the process data sets measured are then cached in a buffer, which is a circular buffer, which may have a retention time of, merely as examples, one hour or several days, so that the process data in the circular buffer are cyclically overwritten. Further, any other retention time that is convenient may be employed.

In a further step S3, the process data sets saved in the buffer are analysed to detect a coating plant error state and to determine an error code which reproduces the type of error. In the simplest case, analysis of the process data sets saved in the buffer takes place by comparison of the current process data values with specified limits, so that an error is detected if a limit is exceeded. In the simplest case, the error code can identify the process data which is outside the permissible range.

Furthermore, in step S4, emergency stop switches are interrogated to detect an error state, with manual operation of the emergency stop switch by an operator displaying an error state. An appropriate error code will be generated as a function of the identification number of the emergency stop switch operated.

In a further step S5, it will be established whether an error has been detected during operation of the coating plant. Should this not be the case, operation of the coating plant will be continued with the actual measurement and caching of the process data sets. In contrast, should an error be detected, the cached process data sets from the buffer will be selected which were measured within a specified lead time before error detection and within a specified follow-up time after error detection, in a further step S6. The lead time and follow-up time are then specified periods of, for example, 10 seconds.

The error-related process data sets selected in step S6 are then stored with the appropriate error code in time-synchronised form in an individual error file for each error in a further step S7.

In a further step S8, the process data sets saved in the error file are displayed visually in a chart on a monitor for the coating plant operator, as shown schematically in FIG. 2 and which will be described below.

Figure 2:
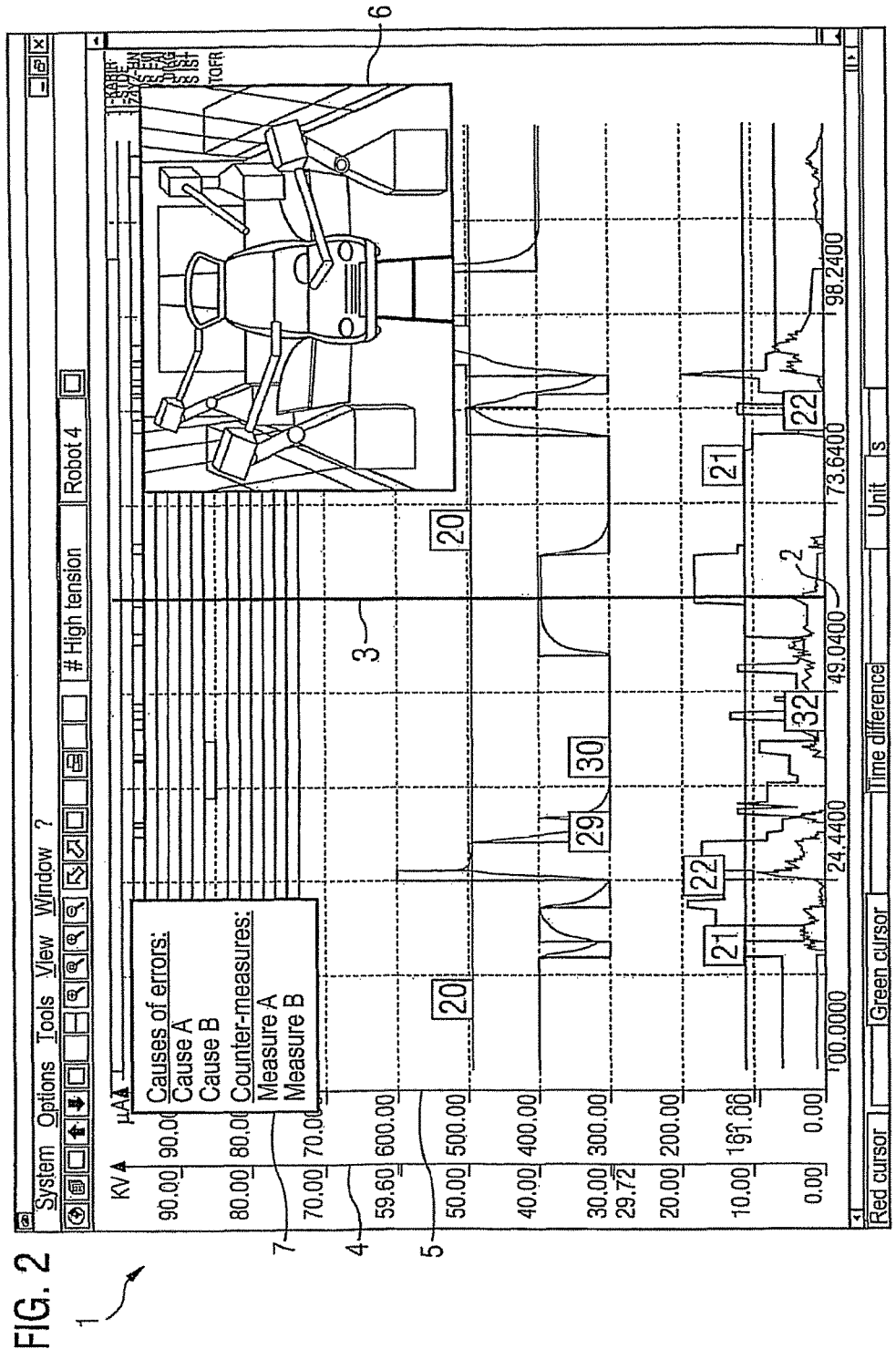
FIG. 2 is a screen shot with an error code and time-synchronised process data curves.

FIG. 2 thus shows a screen shot 1 with time curves 20, 21, 22, 29, 30, 32 of various process data, where time curves 20, 21, 22, 29, 30, 32 are displayed superimposed on each other in time-synchronised form above a common time axis 2, facilitating a precise time attribution of the individual time curves 20, 21, 22, 29, 30, 32 in relation to each other.

Furthermore, the screen displays an error code 3 which expresses the precise time of the error and thus facilitates intuitive attribution to the process data displayed.

Several parameter axes 4, 5 for the various process data are also displayed on the screen, parameter axis 4 expressing, for example, the high-tension voltage of an electrostatic rotary atomiser in kV whilst parameter axis 5 expresses the electric current in µA. However, the user can display or hide other parameter axes. The same also applies to selection of the process data displayed on the screen, so that the user can select those process data important for error analysis in a simple way and have them displayed on screen.

Furthermore, a window 6 is displayed on the screen, in which the physical position of the individual application devices and handling robots is shown as a three-quarter view, to allow intuitive error detection.

Following step S8, error analysis by a computer-assisted expert system of the paint shop operator takes place, to determine possible causes of the error and counter-measures, which are then displayed on the screen in a window 7 in step S10.

Remote data transfer of the error file from the paint shop operator to the paint shop manufacturer then takes place in a further step S11, where error analysis by the manufacturer's specialists can then take place.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

The invention claimed is:

1. An error logging method for a coating plant, comprising:

a) Continuously logging, in a computing device comprising a processor, process data sets of the coating plant, the individual process data sets each being attributed to certain points in coating plant operating time and each containing multiple process data of the coating plant,
b) Storing, by the computing device, the logged process data sets;
c) Detecting, in the computing device, a possible error state of the coating plant;
d) Generating, in the computing device, an error code when a coating plant error state is detected; and
e) Storing, by the computing device, the error code time-synchronised with the stored process data sets where in the case of an error only those process data sets are stored which are logged with a predetermined time frame around the time of the error.

2. The error logging method in accordance with claim 1, further comprising saving the process data sets and error code, the saving the process data sets and error code including:
a) Caching the logged process data sets in a buffer, independently of detection of an error state;
b) Selecting cached process data sets which were detected with a specified lead time before detection of the error state and within a specified follow-up time after detection of the error state, and:
c) Storing the selected process data sets with the error code in an error memory for later error analysis.

3. The error logging method in accordance with claim 2, wherein the follow-up time is selected from a group consisting of:
a) a specified period;
b) a period until correction of the error state;
c) a specific period, within which a specific number of skids or components to be coated is conveyed through the coating plant,
d) a specific period which comprises a certain number of conveyor cycles.

4. The error logging method in accordance with claim 2, wherein the lead time is selected from a group consisting of:
a) a specified period;
b) a specific period, within which a specific number of skids or components is conveyed through the coating plant, or
c) a specific period which comprises a certain number of conveyor cycles.

5. The error logging method in accordance with claim 2, wherein the lead time and the follow-up time for storage of the process data sets is at least 200 milliseconds (ms).

6. The error logging method in accordance with claim 2, wherein the lead time and the follow-up time correspond to a period in which at least one skid is conveyed through the coating plant.

7. The error logging method in accordance with claim 1, wherein the error codes and the relevant process data sets for each coating plant error state are each stored in a dedicated error file.

8. The error logging method in accordance with claim 1, wherein the error code is a timestamp which indicates at the time of the error.

9. The error logging method in accordance with claim 1, wherein the error code shows a type of error detected.

10. The error logging method in accordance with claim 1, wherein storage of the process data sets and the error code takes place with temporal resolution of one of at least 0.1 millisecond (ms).

11. The error logging method in accordance with claim 1, wherein the stored coating plant process data are selected from a group consisting of:
a) Component data characteristic of the coated components;
b) User data, characterizing the interaction between an operator and the coating plant,
c) Plant data characterizing the coating plant itself.

12. The error logging method in accordance with claim 11, further comprising comparing time curves of the logged process data sets are with specified error curves in analyzing the process data sets for detecting an error state.

13. The error logging method in accordance with claim 1, wherein the stored coating plant process data are selected from a group consisting of:
a) Time,
b) Sensor data, which reproduces the measurement signals from sensors,
c) Colour of the coating agent currently being applied in the coating plant,
d) Colour of the coating agent previously applied in the coating plant,
e) Identification number of the skid currently located in the coating plant,
f) Identification number of the component currently located in the coating plant, particularly a body, or the components currently located in the coating plant,
g) Type of component or components currently located in the coating plant,
h) Identification number of the looped main of the coating plant currently in use,
i) Identification number of the colour used,
j) Speed of a rotary atomizer,
k) Electrical charging voltage of an electrostatic application device,
l) Electrical charging current of an electrostatic application device,
m) Volume of the coating agent currently being applied,
n) Flow rate of the individual media, particularly flushing agents, solvents, guide air, shroud air for flat spray, knife air, envelope air, drying air, cooling air, turbine bearing air,
o) Current flow of the individual air guide currents,
p) Current guide air pressure,
q) Current horn air flow, current horn air pressure,
r) Current driving air flow, current driving air pressure,
s) Paint pressure,
t) Air pressure and all available air pressure sensor measurements
u) Flushing agent pressure,
v) Pig positions,
w) Temperatures in the coating plant,
x) Moisture in the coating plant,
y) Paint cabin status, particularly ventilation status, water washout status, extraction status
z) Coating plant filling levels,
aa) Coating plant valve switch positions
bb) Position, speed, acceleration, torque of a painting robot,
cc) Target/actual deviation of one or more of the aforementioned process data,
dd) User entries
ee) Brush data, movement program number of the robot,
ff) Conveyor data, particularly conveyor increments and status,
gg) Dryer data and status,
hh) Exchange of data between the control components.

14. The error logging method in accordance with claim 1, further comprising logging the remote transmission of the data sets and the error code to a maintenance service.

15. The error logging method in accordance with claim 1, further comprising:
   a) Storing the process data sets and the error code on an interchangeable mass storage medium;
   b) Transporting the mass storage medium and the stored process data sets to a maintenance service.

16. The error logging method in accordance with claim 1, further comprising:
   a) Reading the stored data code and relevant process data sets;
   b) Visually displaying the read-out error code and relevant process data sets on a monitor.

17. The error logging method in accordance with claim 1, wherein
   a) the stored process data sets also reproduce the spatial position of a coating plant robot; and
   b) the position of the robot is graphically displayed on the screen in the visual display.

18. The error logging method accordance with claim 1, wherein
   a) certain process data are selected from the stored process data according to the error code; and
   b) only the selected process data are displayed visually.

19. The error logging method in accordance with claim 1, further comprising:
   a) Determining possible causes of errors and remedial measures from the stored error code and relevant process data sets; and
   b) Visually displaying possible causes of errors and remedial measures on a display.

20. The error logging method in accordance with claim 1, further comprising suppressing error detection within a specific period following error detection.

21. A non-transitory computer-readable data storage medium having stored thereon a computer program for performing error logging, including programming to:
   continuously log, in a computer comprising a processor, process data sets of the coating plant, the individual process data sets each being attributed to certain points in coating plant operating time and each containing multiple process data of the coating plant;
   store the logged process data sets;
   detect a possible error state of the coating plant;
   generate an error code when a coating plant error state is detected;
   store the error code time-synchronised with the stored process data sets;
   cache the logged process data sets in a buffer, independently of detection of an error state;
   select cached process data sets which were detected with a specified lead time before detection of the error state and within a specified follow-up time after detection of the error state; and
   store the selected process data sets with the error code in an error memory for later error analysis.

* * * * *